(12) United States Patent
Kotanides, Jr.

(10) Patent No.: US 8,322,390 B2
(45) Date of Patent: Dec. 4, 2012

(54) LIGHT WEIGHT STEEL BELTED TIRE DEVICE

(75) Inventor: John Kotanides, Jr., Canton, OH (US)

(73) Assignee: The Goodyear Tire & Rubber Company, Inc., Akron, OH (US)

(*) Notice: Subject to any disclaimer, the term of this patent is extended or adjusted under 35 U.S.C. 154(b) by 844 days.

(21) Appl. No.: 12/262,305

(22) Filed: Oct. 31, 2008

(65) Prior Publication Data

US 2010/0108227 A1    May 6, 2010

(51) Int. Cl.
  *B60C 9/18* (2006.01)
  *B60C 9/22* (2006.01)

(52) U.S. Cl. ........ 152/454; 152/451; 152/526; 152/535; 152/537; 152/538

(58) Field of Classification Search ........... 152/531, 152/532, 533, 534, 535, 536, 537, 538, 526, 152/527, 451, 454
See application file for complete search history.

(56) References Cited

U.S. PATENT DOCUMENTS

| | | | |
|---|---|---|---|
| 4,286,644 A * | 9/1981 | Pond, Jr. .................. | 152/531 |
| 4,635,696 A | 1/1987 | Gasowski et al. | |
| 4,869,307 A * | 9/1989 | Bormann et al. ........... | 152/533 |
| 5,261,474 A * | 11/1993 | Lobb et al. ................. | 152/454 |
| 5,435,369 A * | 7/1995 | Yap et al. .................. | 152/454 |
| 5,616,195 A * | 4/1997 | Marquet et al. ........ | 152/209.14 |
| 5,660,652 A * | 8/1997 | Young et al. .......... | 152/209.14 |
| 6,016,857 A | 1/2000 | Roesgen et al. | |
| 6,016,858 A | 1/2000 | Roesgen et al. | |
| 6,082,423 A | 7/2000 | Roesgen et al. | |
| 6,298,893 B1 * | 10/2001 | Vannan et al. ............ | 152/541 |
| 6,817,395 B2 * | 11/2004 | Sinopoli et al. .......... | 152/527 |
| 6,868,882 B2 * | 3/2005 | Gillard et al. ............ | 152/531 |
| 6,959,746 B2 | 11/2005 | Shimizu | |
| 7,104,299 B2 | 9/2006 | Rayman et al. | |
| 7,267,149 B2 * | 9/2007 | Kotanides, Jr. ............ | 152/527 |
| 7,490,648 B2 * | 2/2009 | Kotanides, Jr. ............ | 152/531 |
| 7,503,363 B2 * | 3/2009 | Kotanides, Jr. ............ | 152/531 |
| 2004/0055683 A1 * | 3/2004 | Feider et al. ........... | 152/209.16 |
| 2004/0112493 A1 * | 6/2004 | Warchol et al. ........ | 152/209.16 |
| 2006/0225825 A1 * | 10/2006 | Kotanides, Jr. ........... | 152/527 |
| 2006/0225826 A1 * | 10/2006 | Kotanides, Jr. ........... | 152/531 |
| 2007/0144650 A1 * | 6/2007 | Tsuda ..................... | 152/537 |
| 2008/0295945 A1 * | 12/2008 | Kotanides, Jr. ........... | 152/531 |

FOREIGN PATENT DOCUMENTS

| | | |
|---|---|---|
| EP | 1872972 | 1/2008 |
| FR | 2910379 | 6/2008 |
| WO | 2008010379 | 1/2008 |

* cited by examiner

*Primary Examiner* — Joseph S. Del Sole
*Assistant Examiner* — Seyed Masoud Malekzadeh
(74) *Attorney, Agent, or Firm* — Roger D. Emerson; Nathan B. Webb; Emerson Thomson Bennett, LLC

(57) ABSTRACT

The present invention generally relates to light weight tire devices comprising a plurality of layers of steel belts. The layers are each a predetermined fraction of the footprint width, and the width of each layer can vary from one layer to another. Some embodiments also include a pair of wedge strips disposed between two reinforcing layers. Furthermore, some embodiments can include a split belt, wherein the gap between the split belts is substantially occupied by a gum strip. Additionally, the belt ply cords can be angled according to one or more patterns.

20 Claims, 1 Drawing Sheet

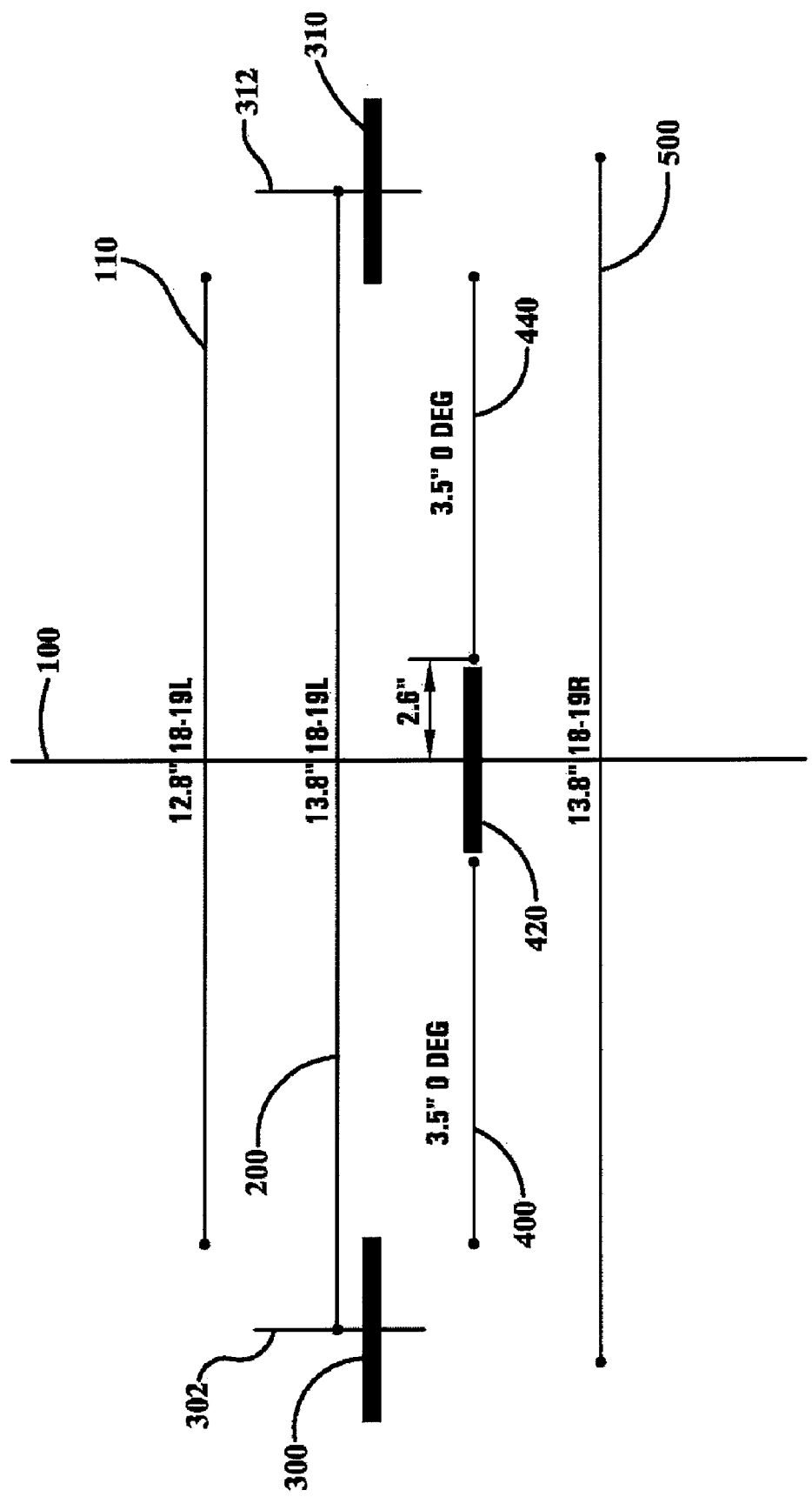

LIGHT WEIGHT STEEL BELTED TIRE DEVICE

I. BACKGROUND OF THE INVENTION

A. Field of Invention

This invention generally relates to light weight steel belted tires and related systems and methods.

B. Description of the Related Art

It is well known that tire mass affects fuel efficiency as well as other operating characteristics of a vehicle. Furthermore, tire mass becomes more important as the size of the tires increase. For instance, tractor trailer tires can impact fuel efficiency more than that of a passenger car. Accordingly it is especially beneficial to use light weight tires for such vehicles. A number of attempts have been made to reduce the mass of such tires. For instance, some prior attempts include using non-steel reinforcing materials, such as aramids or fiberglass. However, such tires lack many of the benefits imparted by steel belts. Accordingly, there is a need in the art for a tire that is light weight and made from steel belts.

The present invention provides alternatives to state of the art tires including light weight steel belted tires.

II. SUMMARY OF THE INVENTION

Some embodiments of the present invention relate to a tire, comprising: a tread defining a footprint width, and the tread defining a center line, a first reinforcing layer disposed comprising a steel belt defining a width from about 90% to about 98% of the footprint width, a second reinforcing layer disposed above the first reinforcing layer and comprising a pair of steel belts equally spaced apart from the center line and on opposing sides of the center line, and the space between the belts being substantially filled by a gum strip, a third reinforcing layer disposed above the second reinforcing layer and comprising a steel belt defining a width from about 90% to about 100% of the footprint width, a wedge layer disposed above the second reinforcing layer and under the third reinforcing layer, and a fourth reinforcing layer disposed under the tread and above the third reinforcing layer and comprising a steel or nylon belt, the belt defining a width from about 60% to about 88% of the footprint width;

Other embodiments relate to a tire, comprising: a tread defining a footprint width, and the tread defining a center line, a first reinforcing layer comprising a steel belt defining a width from about 90% to about 98% of the footprint width, wherein the steel belt of the first reinforcing layer defines a belt ply cord angle of about 15 to about 23 R, a second reinforcing layer disposed above the first reinforcing layer and comprising a pair of steel belts equally spaced apart from the center line and on opposing sides of the center line, and the space between the belts being substantially filled by a gum strip defining a width of about 1.6 to 3.0 inches per half, wherein each of the steel belts of the second reinforcing layer define a belt ply cord angle of about 2 R to about 2 L, a third reinforcing layer disposed above the second layer and comprising a steel belt defining a width from about 90% to about 100% of the footprint width, wherein the steel belt of the third reinforcing layer defines a belt ply cord angle of about 15 to about 23 L, a wedge layer disposed under the third reinforcing layer, wherein the wedge layer comprises a pair of wedges spaced apart laterally by equal distances from the tread center line, and on opposite sides of the tread center line, and wherein each wedge defines a wedge center line, and the wedge center line of each wedge aligns with an edge of the steel belt of the third reinforcing layer, and a fourth reinforcing layer disposed under the tread above the third reinforcing layer and comprising a steel or nylon belt, the belt defining a width from about 60% to about 88% of the footprint width, wherein the belt of the first reinforcing layer defines a belt ply cord angle of about 15 to about 23 L or a belt ply cord angle of about 15 to about 23 R.

One advantage of the present invention is that the tire weight can be reduced.

Another advantage of the present invention is, in one embodiment of the invention, the plysteer will increase and the crown durability, cornering force, and high speed will be improved.

Other benefits and advantages will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIG. 1 is a cross sectional drawing of an embodiment showing the relative positions of the various layers.

IV. DETAILED DESCRIPTION OF THE INVENTION

The present invention generally relates to light weight steel belted tires and related systems and methods. According to some embodiments, a light weight tire device comprises a plurality of reinforcing layers comprising steel belts. Each of the steel belts defines a width that is a predetermined fraction of the tire tread width. Furthermore, the steel belts can comprise ply cords oriented at an angle relative to a centerline of the tire tread. For instance, some ply cord angles can include, without limitation, about 15 to about 23 degrees (which includes, without limitation, 15, 16, 17, 18, 19, 20, 21, 22, and 23 degrees), wherein the angle slopes to the left. This angle range can be equivalently represented as 15 to 23 L. Other acceptable ranges can include, without limitation about 15 to about 23 R (which includes, without limitation, 15, 16, 17, 18, 19, 20, 21, 22, and 23 degrees), wherein the angle slopes to the right. Still other acceptable ply cord angles can include approximately zero degrees, which means the ply cords are approximately parallel to the tread center line.

Some embodiments comprise a tread defining a footprint width. As used herein the term "footprint" includes the surface of a tire that contacts the ground when the tire is in a non-loaded state. Some embodiments also include a first reinforcing layer, which can comprise a steel belt defining a width. Some embodiments also include a second reinforcing layer disposed above the first reinforcing layer, which comprises a pair of steel belts defining equal widths and spaced laterally apart from each other by equal distances from the tread center line. According to some embodiments the space between the pair of steel belts of the second reinforcing layer is substantially occupied by a gum strip. Some embodiments include a pair of wedge strips disposed above the second reinforcing layer. The wedge strips each define equal widths, and are spaced laterally apart from each other by equal distances from the tread center line. Furthermore, each wedge strip defines a wedge center line. The wedge center line of each wedge is aligned with an opposing edge of the steel belt of a third reinforcing layer. Some embodiments further comprise a third reinforcing layer disposed above the pair of wedge strips, Some embodiments further include a fourth reinforcing layer disposed above the third reinforcing layer, which can comprise a steel belt defining a width.

The tread can define any of a wide variety of footprint widths. Some acceptable footprint widths include, without limitation, about 7.80 to about 17 inches. Other acceptable widths include about 8 to about 10 inches, about 10 to about 12 inches, about 12 to about 14 inches, about 14 to about 16 inches, and about 16 to about 17 inches. Here, as elsewhere in the specification and claims, ranges may be combined. Generally, larger tires garner a greater benefit from the weight reducing effect of the present invention. Accordingly, some embodiments can have footprint widths in excess of 17 inches.

According to some embodiments the steel belt of the fourth reinforcing layer defines a width that can differ from that of other reinforcing layers. Furthermore, the steel or nylon belt can equal any of a range of predetermined fractions of the footprint width. For example some fractions of the footprint width include, without limitation, about 60 to about 88% (which includes, without limitation, 60, 61, 62, 63, 64, 65, 66, 67, 68, 69, 70, 71, 72, 73, 74, 75, 76, 77, 78, 79, 80, 81, 82, 83, 84, 85, 86, 87, and 88). More specifically, some acceptable ranges can include, without limitation, about 60 to about 62%, about 62 to about 64%, about 64 to about 66%, about 66 to about 68%, about 68 to about 70%, about 70 to about 72%, about 72 to about 74%, about 74 to about 76%, about 76 to about 78%, about 78 to about 80%, about 80 to about 82%, about 82 to about 84%, about 84 to about 86%, and about 86 to about 88%. In one embodiment, the fourth reinforcing layer has a width that is about 86% of the footprint width. Furthermore, the steel belt of the fourth reinforcing layer can comprise a plurality of belt ply cords oriented at an angle relative to the tread center line. For instance, some angles include, without limitation 15 to 23 degrees (which includes, without limitation, 15, 16, 17, 18, 19, 20, 21, 22, and 23 degrees) sloping either to the right or to the left relative to the tread center line. More specifically, some angle ranges include about 15 to about 17 degrees, about 17 to about 19 degrees, about 18 to about 19 degrees, about 19 to about 21 degrees, and about 21 to about 23 degrees.

According to some embodiments the steel belt of the third reinforcing layer defines a width that can differ from that of other reinforcing layers. Furthermore, the steel belt can equal any of a range of predetermined fractions of the footprint width. For example some fractions of the footprint width include, without limitation, about 90 to about 100% (which includes, without limitation, 90, 91, 92, 93, 94, 95, 96, 97, 98, 99, and 100). More specifically, some acceptable ranges can include, without limitation, about 90 to about 92%, about 92 to about 94%, about 94 to about 96%, about 96 to about 98%, and about 98 to about 100%. In one embodiment, the third reinforcing layer has a width that is about 93% of the footprint width. Furthermore, the steel belt of the third reinforcing layer can comprise a plurality of belt ply cords oriented at an angle relative to the tread center line. For instance, some angles include, without limitation about 15 to about 23 degrees (which includes, without limitation, 15, 16, 17, 18, 19, 20, 21, 22, and 23 degrees) sloping to the left relative to the tread center line. More specifically, some angle ranges include about 15 to about 17 degrees, about 17 to about 19 degrees, about 18 to about 19 degrees, about 19 to about 21 degrees, and about 21 to 23 degrees.

According to some embodiments, the wedge strips can comprise any of a variety of widths provided the wedge center line of each wedge is aligned with opposing edges of the second reinforcing layer. However, according to such embodiments, the upper limit is set by the width of the third reinforcing layer relative to that of the footprint width. Specifically, in order to prevent the wedges from extending beyond the edge of the footprint, the width of each wedge strip can be no larger than $[w_{fp}(1-p)]/2$, where p is the ratio of the width of the third reinforcing layer divided by the footprint width, and $w_{fp}$ is the footprint width. Notably, in some alternative embodiments the wedge center lines of each wedge strip do not need to be aligned with opposing edges of the third reinforcing layer. In such embodiments, the width of each wedge strip is not limited by the foregoing equation.

According to some embodiments the pair of steel belts comprising the second reinforcing layer can define widths that differ from that of other reinforcing layers. Furthermore, the second reinforcing layer can equal any of a range of predetermined fractions of the footprint width. For example some fractions of the footprint width include, without limitation, about 70 to about 84% (which includes, without limitation, 70, 71, 72, 73, 74, 75, 76, 77, 78, 79, 80, 81, 82, 83, and 84). More specifically, some acceptable ranges can include, without limitation, about 70 to about 72%, about 72 to about 74%, about 74 to about 76%, about 76 to about 78%, about 78 to about 80%, about 80 to about 82%, and about 82 to about 84%. In one embodiment, the second reinforcing layer has a width that is about 82% of the footprint width. Furthermore, the steel belts of the second reinforcing layer can comprise a plurality of belt ply cords oriented at approximately zero degrees relative to the tread center line, or parallel to the tread center line.

According to some embodiments the steel belt of the first reinforcing layer defines a width that can differ from that of other reinforcing layers. Furthermore, the steel belt can equal any of a range of predetermined fractions of the footprint width. For example some fractions of the footprint width include, without limitation, about 90 to about 98% (which includes, without limitation, 90, 91, 92, 93, 94, 95, 96, 97, and 98). More specifically, some acceptable ranges can include, without limitation, about 90 to about 92%, about 92 to about 94%, about 94 to about 96%, and about 96 to about 98%. In one embodiment, the first reinforcing layer has a width that is about 97% of the footprint width. Furthermore, the steel belt of the first reinforcing layer can comprise a plurality of belt ply cords oriented at an angle relative to the tread center line. For instance, some angles include, without limitation about 15 to about 23 degrees (which includes, without limitation, 15, 16, 17, 18, 19, 20, 21, 22, and 23 degrees) sloping to the right relative to the tread center line. More specifically, some angle ranges include about 15 to about 17 degrees, about 17 to about 19 degrees, about 18 to about 19 degrees, about 19 to about 21 degrees, and about 21 to about 23 degrees.

Referring now to the drawing wherein the showings are for purposes of illustrating embodiments of the invention only and not for purposes of limiting the same, FIG. 1 is a schematic drawing showing relative sizes of the belts of an embodiment, assuming a footprint width of 14.8 inches. According to FIG. 1, a fourth reinforcing layer 110 comprises a steel or nylon belt having belt ply cords oriented at 18 L to 19 L. In this particular embodiment, the width of the belt is 12.8 inches, which is 86% of the footprint width. A third reinforcing layer 200 is disposed under the fourth reinforcing layer and also comprises a steel belt and defines a width of 13.8 inches, which is 93% of the footprint width. The steel belt of this layer includes belt ply cords oriented at an angle of 18 L to 19 L.

The embodiment shown in FIG. 1 also includes a pair of wedge strips 300, 310 each defining a wedge center line 302, 312 that are aligned with opposing edges of the third reinforcing layer 200. Accordingly, the maximum width of the wedge strips is governed by the equation $[w_{fp}(1-p)]/2$. The second reinforcing layer is disposed under the wedge strips 300, 310 and comprises a pair of steel belts 400, 440. In this embodiment the total width of the second reinforcing layer is 12.2 inches. The steel belts 400, 440 comprise belt ply cords oriented at approximately zero degrees relative to the tread center line. Each steel belt 400, 440 has a width of 3.5 inches, which is about 29% of the overall width of the second reinforcing layer. Each steel belt 400, 440 is also 2.6 inches from the tread center line 100. The gap between the steel belts 400, 440 is substantially occupied by a gum strip having a width of 5.2 inches, which is about 43% of the total width of the second reinforcing layer. Finally, the embodiment of FIG. 1 includes a first reinforcing layer 500 comprising a steel belt having a width of 14.4 inches, which is 97% of the footprint width. The steel belt of this layer comprises belt ply cords oriented at an angle of 18 to 19 R.

The embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof.

I claim:

1. A tire, comprising:
    a tread defining a footprint width, and the tread defining a center line;
    a first reinforcing layer comprising a steel belt defining a width from about 91% to about 98% of the footprint width;
    a second reinforcing layer disposed on top of the first reinforcing layer comprising a pair of steel belts equally spaced apart from the center line and on opposing sides of the center line, and the space between the belts being substantially filled by a gum strip;
    a wedge layer disposed on top of the second reinforcing layer;
    a third reinforcing layer disposed on top of the wedge layer and the second reinforcing layer and comprising a steel belt defining a width from about 90% to about 97% of the footprint width;
    at least a fourth reinforcing layer disposed on top of the third reinforcing layer and comprising a steel or nylon belt, the belt defining a width from about 60% to about 88% of the footprint width; and,
    wherein the width of the first reinforcing layer is greater than the width of the second, third and fourth reinforcing layers.

2. The tire of claim 1, wherein the footprint width is about 7.80 to about 17 inches.

3. The tire of claim 2, wherein the width of the third reinforcing layer is greater than the width of the second reinforcing.

4. The tire of claim 1, wherein the belt of the fourth reinforcing layer defines a belt ply cord angle of about 15 to about 23 L or a belt ply cord angle of about 15 to about 23 R.

5. The tire of claim 4, wherein the belt of the fourth reinforcing layer defines a belt ply cord angle of about 18 to about 19 L.

6. The tire of claim 3, wherein the steel belt of he third reinforcing layer defines a belt ply cord angle of about 15 to about 23 L.

7. The tire of claim 6, wherein the steel belt of the third reinforcing layer defines a belt ply cord angle of about 18 to about 19 L.

8. The tire of claim 1, wherein the wedge layer comprises a pair of wedges spaced apart laterally by substantially equal distances from the center line, and on opposite sides of the center line.

9. The tire of claim 8, wherein each wedge defines a center line, and the center line of each wedge aligns with an edge of the steel belt of the third reinforcing layer.

10. The tire of claim 1, wherein each of the steel belts of the second reinforcing layer define a belt ply cord angle of about 2 R to about 2 L.

11. The tire of claim 10, wherein each of the steel belts of the second reinforcing layer define a belt ply cord angle of about 0.

12. The tire of claim 1, wherein the steel belt of the first reinforcing layer defines a belt ply cord angle of about 15 to about 23 R.

13. The tire of claim 12, wherein the steel belt of the first reinforcing layer defines a belt ply cord angle of about 18 to about 19 R.

14. A tire comprising:
    a tread defining a footprint width, and the tread defining a center line:
    a first reinforcing layer comprising a steel belt defining a width from about 91% to about 98% of the footprint width, wherein the steel belt of the first reinforcing layer defines a belt ply cord angle of about 15 to about 23 R;
    a second reinforcing layer disposed on top of the first reinforcing layer and comprising a pair of steel belts substantially equally spaced apart from the center line and on opposing sides of the center line, and the space between the belts being substantially filled by a gum strip defining a width of about 3.2 to about 6.0 inches, wherein each of the steel belts of the second reinforcing layer define a belt cord angle of between about 2 R to about 2 L;
    a third reinforcing layer disposed on top of the second reinforcing layer and comprising a steel belt defining a width from about 90% to about 97% of the footprint width, wherein the steel belt of the second reinforcing layer defines a belt ply cord angle of about 15 to about 23 L;
    a wedge layer disposed on top of the second reinforcing layer and under the third reinforcing layer, wherein the wedge layer comprises a pair of wedges spaced apart laterally by equal distances from the tread center line, and on opposite sides of the tread center line, and wherein each wedge defines a wedge center line, and the wedge center line of each wedge aligns with an edge of the steel belt of the third reinforcing layer;
    at least a fourth reinforcing layer disposed on top of the third reinforcing layer and comprising a steel or nylon belt, the belt defining a width from about 60% to about 88% of the footprint width, wherein the belt of the fourth reinforcing layer defines a belt ply cord angle of about 15 to about 23 L or a belt ply cord angle of about 15 to about 23 R; and,
    wherein the width of the first reinforcing layer is greater than the width of the second, third and fourth reinforcing layers.

15. The tire of claim 14, wherein the width of the third reinforcing layer is greater than the width of the second reinforcing layer.

16. The tire of claim 15, wherein the belt of the fourth reinforcing layer defines a belt ply cord angle of about 18 to about 19 L.

17. The tire of claim 15, wherein the steel belt of the third reinforcing layer defines a belt ply cord angle of about 18 to about 19 L.

18. The tire of claim 15, wherein each of the steel belts of the second reinforcing layer define a belt ply cord angle of about 0.

19. The tire of claim 15, wherein the steel belt of the first reinforcing layer defines a belt ply cord angle of about 18 to about 19 R.

20. The tire of claim 15, wherein the space between the steel belts of the second reinforcing layer is substantially filled by a gum strip defining a width of about 5.2 inches.

* * * * *